United States Patent
Wiewiorka

(10) Patent No.: US 12,438,925 B2
(45) Date of Patent: Oct. 7, 2025

(54) COMMUNICATION WITH A BANK TELLER

(71) Applicant: DIGITAL FIRST HOLDINGS LLC, Atlanta, GA (US)

(72) Inventor: Maxwell Alfred Wiewiorka, Scotland (GB)

(73) Assignee: DIGITAL FIRST HOLDINGS LLC, Atlanta, GA (US)

( * ) Notice: Subject to any disclaimer, the term of this patent is extended or adjusted under 35 U.S.C. 154(b) by 203 days.

(21) Appl. No.: 18/216,652

(22) Filed: Jun. 30, 2023

(65) Prior Publication Data

US 2025/0007962 A1    Jan. 2, 2025

(51) Int. Cl.
*H04L 65/1069* (2022.01)
*G06K 7/14* (2006.01)

(52) U.S. Cl.
CPC ........ *H04L 65/1069* (2013.01); *G06K 7/1413* (2013.01); *G06K 7/1417* (2013.01)

(58) Field of Classification Search
CPC . H04L 65/1069; G06K 7/1413; G06K 7/1417
See application file for complete search history.

(56) References Cited

U.S. PATENT DOCUMENTS

| | | | |
|---|---|---|---|
| 10,552,810 B1 * | 2/2020 | Ethington | G06Q 20/042 |
| 10,574,879 B1 * | 2/2020 | Prasad | H04N 5/44 |
| 10,825,004 B1 | 11/2020 | Walker et al. | |
| 2014/0337213 A1 * | 11/2014 | Chang | G07F 19/201 705/43 |
| 2016/0098700 A1 | 4/2016 | Johnson et al. | |
| 2016/0358139 A1 * | 12/2016 | Keys | G06Q 20/385 |
| 2017/0175411 A1 * | 6/2017 | Bowers | G07F 19/201 |
| 2021/0158315 A1 * | 5/2021 | Phillips | H04W 12/06 |

OTHER PUBLICATIONS

Oct. 28, 2024 Search Report in corresponding European Patent Appl. No. 24185437.1.

* cited by examiner

*Primary Examiner* — Kristie D Shingles
(74) *Attorney, Agent, or Firm* — Notaro, Michalos & Zaccaria P.C.; John S. Economou

(57) ABSTRACT

A method and a computing system for detecting, at an ATM, an input event indicating that a user of the ATM wants to communicate with a bank teller; responsive to detecting the input event, by the ATM, sending a notification to at least one first telecommunications device of a selected remote bank teller indicating that the user wants to communicate and requesting the user to input contact information into the ATM and/or to scan a machine-readable code displayed on the ATM with a mobile device of the user; responsive to the user inputting the contact information into the ATM and/or scanning the machine-readable code displayed on the ATM with the mobile device, establishing, by the first telecommunications device or a second telecommunications device of the selected remote bank teller, a communication link with the mobile device of the user.

20 Claims, 3 Drawing Sheets

COMMUNICATION WITH A BANK TELLER

FIELD OF THE INVENTION

The present invention relates to a method and a computing system for establishing a communication link between a device belonging to a user of an ATM and a device that is being operated by a remote bank teller. In particular, but not exclusively, the present invention relates to a methodology by which a user, present at an ATM, can input contact information into the ATM or scan a machine-readable code displayed on the ATM to thereby enable a remote bank teller to use one of their devices to establish a communication link with a mobile device in the possession of the user to thereby enable the remote teller to assist the user with the transaction on the ATM.

BACKGROUND

Automated Teller Machines (ATMs) are known. An automated teller machine (ATM) is an electronic banking outlet that allows customers/users to complete basic transactions without the aid of a bank representative or teller. Anyone with a credit card or debit card can access cash at most ATMs. ATMs provide both basic cash-dispensing services as well as advanced functions, including: check depositing, account information access, fund transfers, marketing of relevant products and the like. Historically, ATMs have not included any functionality to enable a user to communicate with a remote bank teller. However, newer types of ATM do have additional functionality that enables a user to communicate with a bank teller. These new types of ATMs are sometimes referred to as Interactive Teller Machines (ITMs). ITMs offer the basic components of an ATM, such as the receipt printer and card reader; however, ITMs usually include additional features such as: a video camera and telephone for conducting conversations with a teller, a coin dispenser for distributing different denominations of coins, an ID scanner for verifying the customer's identity, a signature pad and the like.

For older ATMs which are not ITMs and do not have any functionality for enabling communication with a remote bank teller, it is thus not possible for a user to use these machines to communicate with a bank teller. This prevents users who require ITM use (for completing certain transactions), but there are only conventional ATMs within reasonable distance to use, from using such ITMs. Furthermore, even if ITMs are accessible, some users are still reluctant to use them for health reasons due to the ITM handset being a frequent touchpoint & its proximity to the user's face in use.

SUMMARY

It is an aim of the present invention to at least partly mitigate one or more of the above-mentioned problems.

It is an aim of certain embodiments of the present invention to help provide a methodology for a user of an ATM to communicate with a remote bank teller during a transaction, via their mobile device.

It is an aim of certain embodiments of the present invention to help provide functionality at an ATM that allows a user to establish a communication link with a device of a remote bank teller via their mobile device.

It is an aim of certain embodiments to provide an ATM with or without ITM functionality that enables a user to input contact information and/or scan a machine-readable code so that a communication link can be established between the user's mobile device and a telecommunications device of a remote bank teller.

It is an aim of certain embodiments of the present invention to help a customer access ITM features on non-ITM units though use of their smartphone to connect to a remote assistant via audio and optionally using a portrait camera to provide a video feed.

It is an aim of certain embodiments of the present invention to help provide an upgrade to field & future production units, that do not have ITM features, to have access to ITM capabilities via integration of the user's smartphone.

It is an aim of certain embodiments of the present invention to help provide an ATM with ITM capability that is with a reduced need for physical contact if required by the customer or required for the customer's safety.

According to a first aspect of the present invention there is provided a computer-implemented method for establishing a communication link between a mobile device of a user of an ATM and a telecommunications device of a selected remote bank teller, comprising the steps of: detecting, at an ATM, an input event indicating that a user of the ATM wants to communicate with a bank teller; responsive to detecting the input event, by the ATM, sending a notification to at least one first telecommunications device of a selected remote bank teller indicating that the user wants to communicate and requesting the user to input contact information into the ATM and/or to scan a machine-readable code displayed on the ATM with a mobile device of the user; responsive to the user inputting the contact information into the ATM and/or scanning the machine-readable code displayed on the ATM with the mobile device, establishing, by the first telecommunications device or a second telecommunications device of the selected remote bank teller, a communication link with the mobile device of the user.

Aptly, the method further comprises: responsive to sending the notification to the first telecommunications device, accessing, by the first telecommunications device of the selected remote bank teller, a web-based communication portal via a web browser executing on the first telecommunications device; and responsive to scanning the machine-readable code displayed on the ATM with the mobile device, accessing, by the mobile device, the web-based communication portal via a web browser executing on the mobile device; thereby establishing the communication link between the first telecommunications device and the mobile device.

Aptly, the first telecommunications device is a desktop computer or a laptop or a mobile device of the selected remote bank teller.

Aptly, the machine-readable code is a one-dimensional or two-dimensional barcode, and is optionally a quick response code.

Aptly, the method further comprises: responsive to detecting the input event, displaying the machine-readable code on a display of the ATM; and scanning, by the mobile device, the machine-readable code that is displayed on the display of the ATM.

Aptly, the method further comprises: responsive to detecting the input event, requesting the user to scan a machine-readable code displayed on a housing of the ATM with a mobile device of the user; and scanning, by the mobile device, the machine-readable code that is displayed on the housing of the ATM.

Aptly, the method further comprises: responsive to sending the notification to the first telecommunications device, accessing, by the first telecommunications device of the selected remote bank teller, a web-based communication portal via a web browser executing on the first telecommunications device; responsive to the user inputting an email address for the user into the ATM, receiving, at the mobile device, a web link via email for accessing the web-based communication portal; and responsive to the mobile device determining that the web link has been selected by the user, accessing, by the mobile device, the web-based communication portal via a web browser executing on the mobile device; thereby establishing the communication link between the first telecommunications device and the mobile device. Aptly, the first telecommunications device is a desktop computer or a laptop or a mobile device of the selected remote bank teller.

Aptly, the method further comprises: establishing the communication link as a Voice over Internet Protocol communication link.

Aptly, the method further comprises: responsive to the user inputting a phone number of the mobile device into the ATM, sending, by the ATM, the phone number to the first telecommunications device of the selected remote bank teller; and responsive to the first telecommunications device receiving the phone number, calling, by the second telecommunications device of the selected remote bank teller, the mobile device; thereby establishing the communication link between the second telecommunications device and the mobile device.

Aptly, the first telecommunications device is a desktop computer or a laptop or a mobile device of the selected remote bank teller and the second telecommunications device is a landline or mobile device of the selected remote bank teller.

Aptly, the method further comprises: establishing the communication link between the first or second telecommunications device and the mobile device as an audio only communication link.

Aptly, the method further comprises: capturing audio data via a microphone of the mobile device; via the communication link, transmitting the audio data to the first or second telecommunications device; and outputting the audio data via a speaker of the first or second telecommunications device.

Aptly, the method further comprises: capturing audio data via a microphone of the first or second telecommunications device; via the communication link, transmitting the audio data to the mobile device; and outputting the audio data via a speaker of the mobile device.

Aptly, the method further comprises: capturing video data, via a camera of the ATM and/or of the mobile device; providing the video data from the ATM and/or the mobile device to the first telecommunications device; and displaying a video feed comprising the video data on a display of the first telecommunications device.

Aptly, the method further comprises: capturing video data, via a camera of the first telecommunications device; providing the video data from the first telecommunications device to the ATM and/or to the mobile device; and displaying a video feed comprising the video data on a display of the ATM and/or of the mobile device.

Aptly, the ATM is not an Interactive Teller Machine, ITM.

Aptly, the method further comprises: detecting the input event as a request by the user for a web-based communication session with a bank teller or a cellular communication session with a bank teller.

According to a second aspect of the present invention there is provided a computing system, comprising: an ATM, a mobile device of a user and at least one telecommunications device of a selected remote bank teller, wherein the ATM is configured to: detect an input event indicating that a user of the ATM wants to communicate with a bank teller; and send a notification to at least one first telecommunications device of the selected remote bank teller indicating that the user wants to communicate and request the user to input contact information into the ATM and/or to scan a machine-readable code displayed on the ATM with the mobile device of the user; wherein responsive to the user inputting the contact information into the ATM and/or scanning the machine-readable code displayed on the ATM with the mobile device, the first telecommunications device or a second telecommunications device of the selected remote bank teller is configured to: establish a communication link with the mobile device.

Aptly, the first telecommunications device is a desktop computer or a laptop or a mobile device of the selected remote bank teller and the second telecommunications device is a landline or mobile device of the selected remote bank teller.

Certain embodiments of the present invention help provide a methodology for enabling a user to input contact information into an ATM so that a communication link can be established between a mobile device of a user and an electronic device of a selected bank teller.

Certain embodiments of the present invention provide a methodology for enabling a user to scan a machine-readable code displayed on an ATM so that a communication link can be established between a mobile device of a user and an electronic device of a selected bank teller.

Certain embodiments of the present invention help enable a Voice over Internet Protocol communication link to be established between a mobile device of a user of an ATM and a telecommunications device of a remote bank teller.

Certain embodiments of the present invention help enable a cellular communication link to be established between a mobile device of a user of an ATM and a telecommunications device of a remote bank teller.

Certain embodiments of the present invention help reduce necessary contact with an ITM without the loss of functionality. Having the option to use their own smartphone for ITM services may be a more comfortable option for the customer due to the reduced level of contact.

Certain embodiments of the present invention help provide accessibility to ITM capabilities via a non ITM unit.

Certain embodiments of the present invention help reduce the required hardware on an ATM.

BRIEF DESCRIPTION OF THE DRAWINGS

Embodiments of the present invention will now be described hereinafter, by way of example only, with reference to the accompanying drawings in which.

In the drawings like reference numerals refer to like parts.

DETAILED DESCRIPTION

Figure 1:
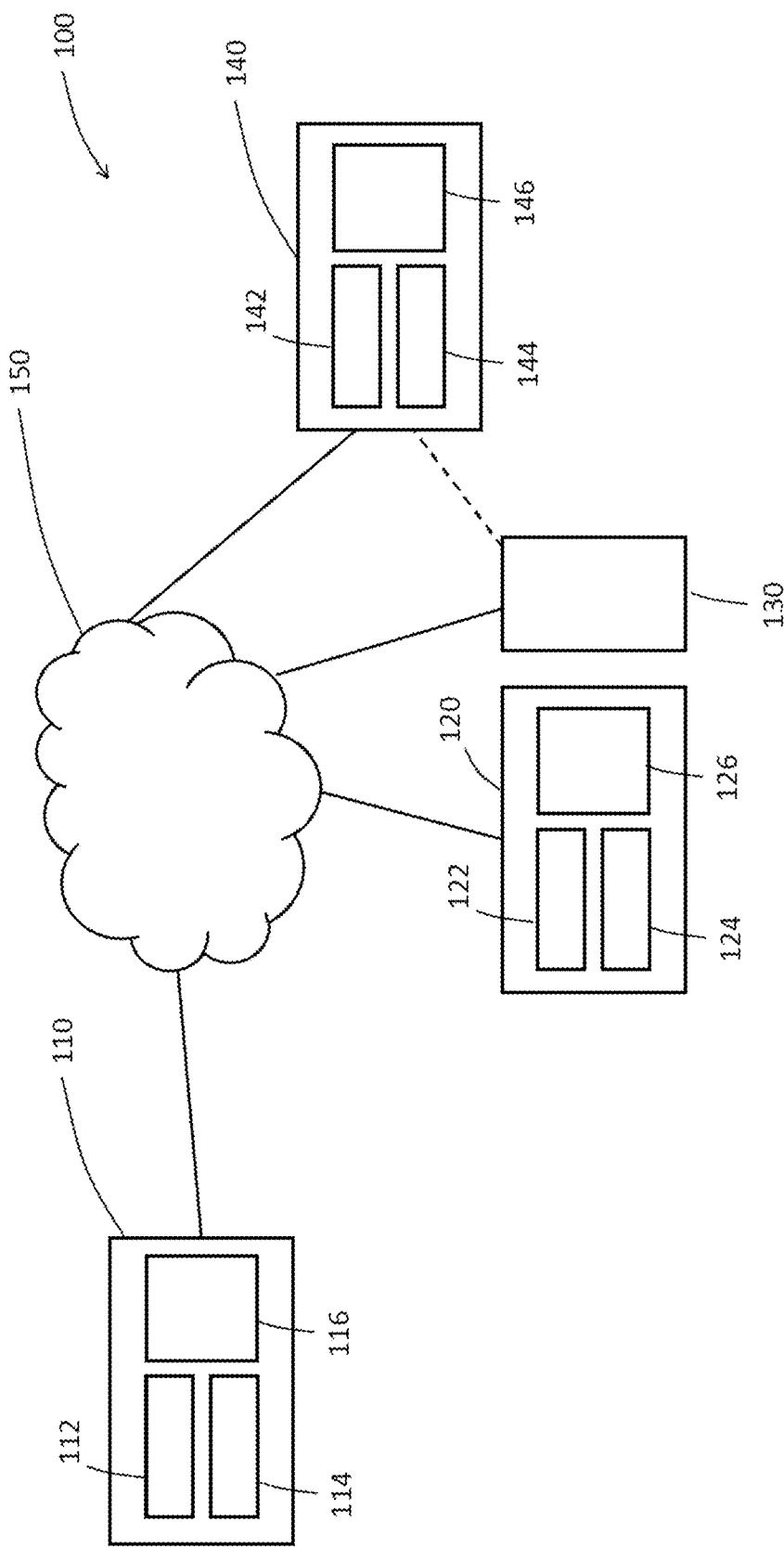
FIG. 1 illustrates a computing system.

FIG. 1 illustrates a computing system 100. In the computing system 100 there is an Automated Teller Machine (ATM) 110, a first telecommunications device 120 of a remote bank teller, a second telecommunications 130 device of a remote bank teller, and a mobile device 140 of a user of the ATM. The ATM may or may not be an Interactive Teller Machine (ITM). The ATM includes one or more processors 112, at least one memory 114 and a display 116. The memory is a non-transitory computer-readable storage medium. The memory 114 stores executable software that is executable by the processors 112 of the ATM. The display 116 displays a graphical user interface for enabling the user to enter details and select options during transactions at the ATM. The executable software of the ATM, when executed by the processor(s), causes the ATM to carry out the methodology described herein. The ATM may also include a communication interface (not shown) for communicating with the first telecommunications device 120. The ATM may also include an encrypted PIN pad (not shown), a note dispenser, a receipt printer, a card slot for insertion of a user's bank card (not shown), a contactless reader (not shown), a camera (not shown), a barcode reader (not shown), a microphone, speakers or the like as will be appreciated by a person of skill in the art. When the ATM is an ITM, the ATM may further include additional functionality. For example, the ITM may include a signature pad, an ID scanner, a telephonic handset, a wired headset, a tactile keyboard, a beamforming microphone or the like as will be appreciated by a person of skill in the art. This hardware may not be present on a conventional non-ITM ATM. The ITM may also have functionality to enable an audio and video communication link to be established with a remote teller device. This functionality may not be present on a conventional non-ITM ATM.

The first telecommunications device is a computing device of the remote bank teller. For example, the computing device may be a laptop, a desktop computer, a mobile device, a tablet or the like. The first telecommunications device 120 also includes one or more processors 122, at least one memory 124 and a display 126. The memory 124 is also a non-transitory computer readable storage medium. The memory 124 stores executable software that is executable by the processors of the first telecommunications device. The display 126 also displays a graphical user interface where the remote bank teller may be shown in real-time a virtual desktop corresponding to the screen being shown on the ATM. The first telecommunications device may also include a communication interface (not shown) for communicating with the ATM and/or the mobile device of the user. The first telecommunications device may also include a microphone (not shown), speakers (not shown), a camera (not shown) and the like.

The second telecommunications device is a device that has functionality for making telephone calls. For example, the second telecommunications device 130 may be a mobile device or a landline telephone. The second telecommunications device may include a communication interface (not shown) for communicating with the mobile device of the user.

The mobile device 140 of the user is for example a smartphone or tablet or the like. The mobile device 140 also includes one or more processors 142, at least one memory 144 and a display 146. The memory 144 is also a non-transitory computer readable storage medium. The memory 144 stores executable software that is executable by the processors of the mobile device. The display 146 also displays a graphical user interface. The mobile device may also include a communication interface (not shown) for communicating with the first or second telecommunications device.

The ATM 110, first telecommunications device 120, and mobile device 140 communicate via a network 150. The network 150 may be wired, wireless or a combination of wired and wireless. For example, the network is the internet. It is noted that no direct communication needs to take place between the ATM and the mobile device. In some instances, the ATM and first telecommunications device may communicate with each via a separate secured private network whereas the first telecommunications device communicates with the mobile device via a public network. If the second telecommunications device is a mobile device of the remote bank teller, then this may communicate with the mobile device of the user via network 150. However, if the second telecommunications device is a landline, this may use a cellular network (not shown) to communicate with the mobile device of the user.

Figure 2:
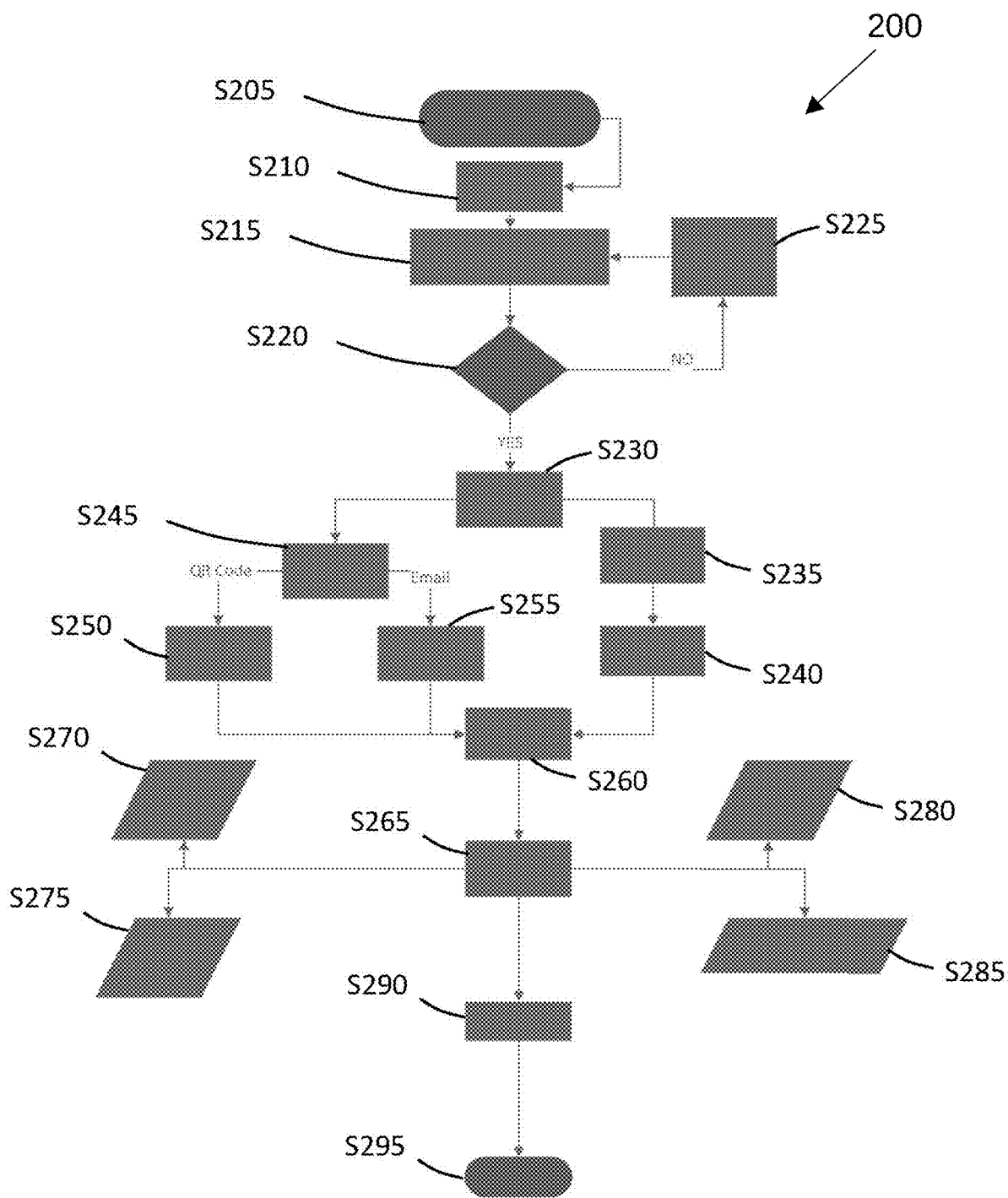
FIG. 2 illustrates a flowchart showing a method for establishing a communication link between a mobile device of a user of an ATM and a telecommunications device of a remote bank teller.

FIG. 2 illustrates a flowchart 200 describing how a communication link is established between a mobile device of a user of an ATM and a first telecommunications device of a remote bank teller. The ATM, mobile device of the user, and first and second telecommunications device may be those as described with reference to FIG. 1. In FIG. 2, the ATM is a non-ITM ATM. However, it will be appreciated that in certain other embodiments the ATM may be an ITM.

At a first step S205, a user approaches an ATM to begin a transaction. The ATM may be a through-the-wall ATM or in a bank branch or the like. Thereafter, in a step S210, the user makes a selection via the display or a keypad of the ATM that they would like to communicate with a bank teller. This selection is detected as an input event by the ATM that the user would like to communicate with a bank teller. In FIG. 2, the user makes a specific selection that they would like this communication to be a web-based communication session (e.g., via VoIP). Once this selection occurs, in some embodiments the ATM may present an interface asking the user to verify their identity (authenticate themselves) in a step S215. For example, the ATM may request that the user inserts a bank card into a card slot of the ATM or scan their card on a contactless reader of the ATM and then enter their PIN. At a step S220, the user's identity is verified (they are authenticated). If the user's identity is correctly verified (they are authenticated), the process proceeds to step S230. If not, the user may have to repeat their identity verification (i.e., the authentication process) as indicated at step S225. Alternatively or additionally, the user's identity may not be verified (they may not be authenticated) until a communication link is established between the devices of the bank teller and the user. In this case, the bank teller may verify identity (authenticate the user) by visually comparing the user's appearance to that of an appearance on a user's ID card.

If the user's identity is correctly verified (they are authenticated), an interactive transaction session may be generated/created between a remote bank teller and a user in a step S230. At this stage, an operator is selected for the interactive transaction session at a step S235. The selected operator may be referred to as a selected bank teller. The ATM then sends a notification to this selected bank teller informing them that the user of the ATM wishes to establish a communication channel via a web-based communication session. The selected remote bank teller may be selected depending on various factors including the user's particular bank, the location of the ATM, remote teller availability or the like. Once the selected bank teller receives this notification at one or more of their telecommunications devices (e.g., at their desktop computer), they access a web-based communication portal via a web browser executing on their device. The operator or selected bank teller thus joins the interactive transaction session in step S240. This portal is also accessible by the user's mobile device as is now described.

Following creation of the interactive transaction session at step S230, the ATM also requests the user to either input contact information (e.g., email address) for the user or to scan a QR code displayed on the ATM. The ATM does this by displaying on the display of the ATM an instruction to the user. This instruction may be for the user to input the information into the ATM via the ATM's keypad. There may a box on the ATM's display where the information will be entered so that the user can check that they have entered the information correctly. Alternatively or additionally, the ATM display may also include an instruction to scan a QR code displayed on the ATM. The QR code may be located on a housing of the ATM or may be displayed on the display of the ATM itself.

At a step S245, the user either enters their contact information (e.g., email address) or scans a QR code. The user can scan a QR code using their native camera application of their mobile device or using dedicated QR code reading software on the mobile device. Other types of machine-readable code may of course be used instead of QR codes. In the example that the user scans a QR code, the mobile device is re-directed to a web browser running on the mobile device. Via this web-browser, the user accesses the same web-based communication portal that is accessed by the remote bank teller's device. The user's mobile device thus opens the portal to the VoIP session at a step S250 and thus joins the interactive transaction session at step S260. If on the other hand the user only enters their email address, a web link for the web-based communication portal is sent to the user via email in step S255. Upon selection of this web link by the user and determination by the mobile device that the web link has been selected, the mobile device is re-directed to a web browser running on the mobile device and accesses the web-based communication portal where they then join the interactive transaction session in step S260. As the user is now part of the interactive transaction session, a communication link has been established between the telecommunications device of the selected bank teller and the mobile device of the user. The transaction session is thus 'in progress' in step S265 enabling bank teller and user to communicate with one another.

At the bank teller's device, an audio feed is received at step S270 from the mobile device including audio data captured via the microphone of the mobile device. The audio feed is output via speaker's of the bank teller's device. This audio feed may be transmitted over the internet. In some embodiments, a video feed may also be received (in addition to the audio feed) at the bank teller's device in step S275. The video feed may be transmitted from the ATM to the bank teller's telecommunications device based on video data captured by a camera of the ATM. Alternatively, or additionally, the video feed may be transmitted from the user's mobile device to the bank teller's device based on video data captured by the camera of the user's mobile device. At the user's mobile device, an audio feed is received at step S280 including audio data captured via a microphone of the bank teller's telecommunications device. This audio feed may be output by the mobile device's speakers. This audio feed may also be transmitted over the internet. In some embodiments, a video feed of the bank teller may also be provided to the user in step S285. For example, a video feed including video data captured by a camera of the bank teller's device may be transmitted to the ATM and displayed on the display of the ATM. Alternatively or additionally, the video feed may also be transmitted to and displayed on a display of the user's mobile device. Thus, it is possible to establish a two-way audio-video communication link between the user's device and the bank teller's device.

In step S290, the user leaves the interactive transaction session. This may be by closing their web browser or powering down their mobile device or putting their mobile device in standby mode or the like. Thereafter, in step S295, the bank teller closes the interactive transaction session by making the appropriate selection on their computing device.

Figure 3:
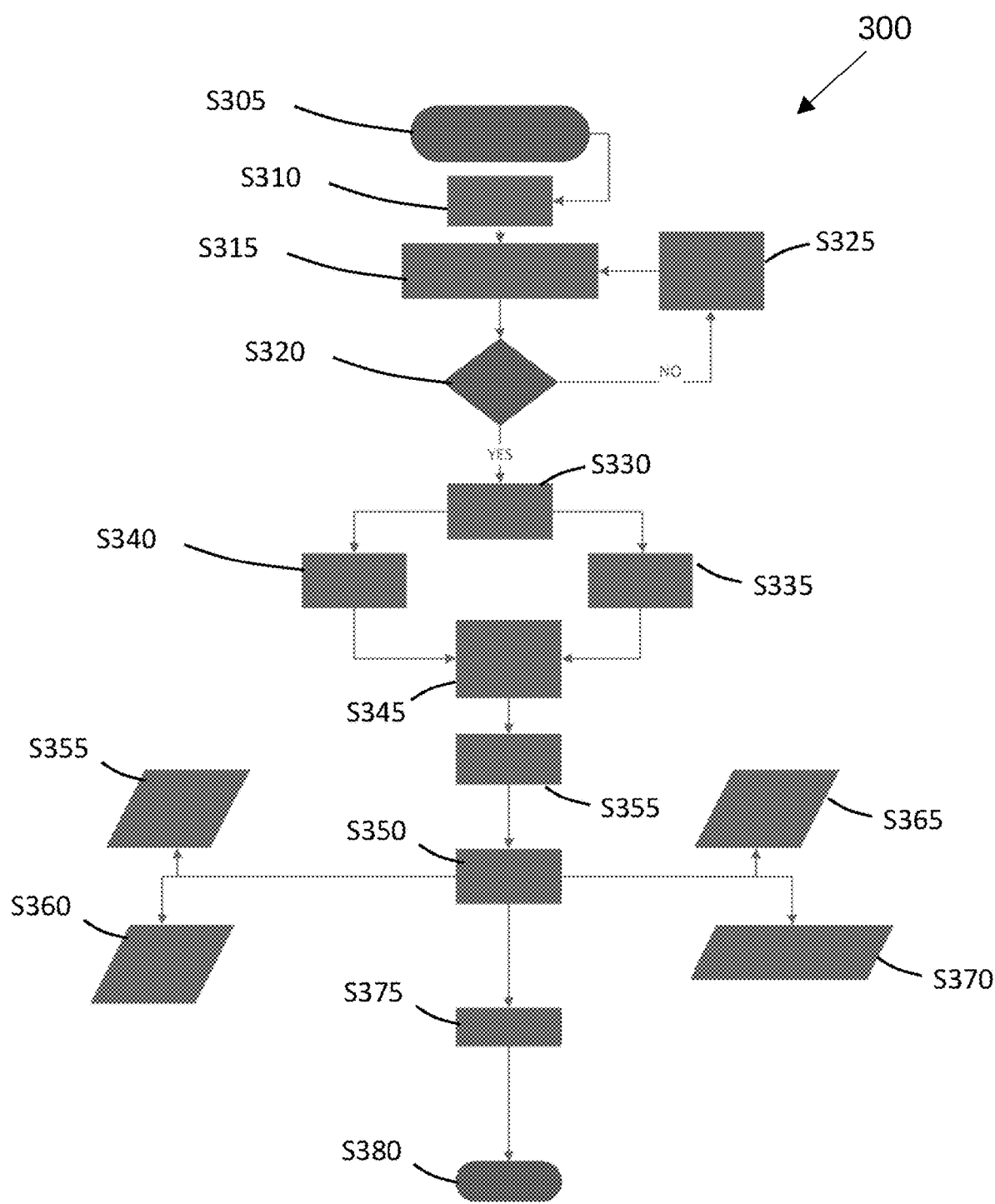
FIG. 3 illustrates a flowchart showing an alternative method for establishing a communication link between a mobile device of a user of an ATM and a telecommunications device of a remote bank teller.

FIG. 3 illustrates a flowchart 300 describing how a communication link is established between a mobile device of a user of an ATM and a second telecommunications device of a remote bank teller. The ATM, mobile device of the user, and first and second telecommunications device may be those as described with reference to FIG. 1. In FIG. 3, the ATM is a non-ITM ATM. However, it will be appreciated that in certain other embodiments the ATM may be an ITM.

At a first step S305, a user approaches an ATM to begin a transaction. The ATM may be a through-the-wall ATM or in a bank branch or the like. Thereafter, in a step S310, the user makes a selection via the display or a keypad of the ATM that they would like to communicate with a bank teller. This selection is detected as an input event by the ATM that the user would like to communicate with a bank teller. In FIG. 3, the user makes a specific selection that they would like this communication to be a cellular session (e.g., via telephone call). Once this selection occurs, in some embodiments the ATM may present an interface asking the user to verify their identity in a step S315. For example, the ATM may request that the user inserts a bank card into a card slot of the ATM or scan their card on a contactless reader of the ATM and then enter their PIN. At a step S320, the user's identity is verified. If the user's identity is correctly verified, the process proceeds to step S330. If not, the user may have to repeat their identity verification as indicated at step S325. Alternatively or additionally, the user's identity may not be verified until a communication link is established between the devices of the bank teller and the user. In this case, the bank teller may verify identity by visually comparing the user's appearance to that of an appearance on a user's ID card.

If the user's identity is correctly verified, an interactive transaction session may be generated/created between a remote bank teller and a user in a step S330. At this stage, an operator is selected for the interactive transaction session at a step S335. The selected operator may be referred to as a selected bank teller. The ATM then sends a notification to this selected bank teller informing them that the user of the ATM wishes to establish a communication channel via cellular-based communication. The selected remote bank teller may be selected depending on various factors including the user's particular bank, the location of the ATM, remote teller availability or the like. Once the selected bank teller receives this notification at one or more of their telecommunications devices (e.g., at their desktop computer), they await for receipt of contact information (e.g., a telephone number) for the user.

Following creation of the interactive transaction session at step S330, the ATM also requests the user to input contact information (e.g., phone number) for the user. The ATM does this by displaying on the display of the ATM an instruction to the user. This instruction may be for the user to input the information into the ATM via the ATM's keypad. There may a box on the ATM's display where the information will be entered so that the user can check that they have entered the information correctly.

At a step S340, the user enters their contact information (e.g., phone number). This phone number is then sent from the ATM to the bank teller's computing device where it is received at step S345. The bank teller then initiates an outgoing cellular call to the user's mobile device via one of their telecommunications devices such as a mobile phone or a landline and this call is received and accepted by the user of the mobile device at step S350. Both the user and the bank teller are thus now part of the interactive transaction session, as a communication link has been established between the telecommunications device of the selected bank teller and the mobile device of the user. The transaction session is thus 'in progress' in step S255 enabling the bank teller and the user to communicate with one another.

At the bank teller's device, an audio feed is received at step S260 from the mobile device including audio data captured via the microphone of the mobile device. The audio feed is output via speaker's of the bank teller's device. This audio feed may be transmitted via cellular communications (i.e., via radio access networks and a core network). In some embodiments, a video feed may also be received (in addition to the audio feed) at the bank teller's device in step S265. The video feed may be transmitted from the ATM to the bank teller's telecommunications device based on video data captured by a camera of the ATM. At the user's mobile device, an audio feed is received at step S270 including audio data captured via a microphone of the bank teller's telecommunications device. This audio feed may be output by the mobile device's speakers. This audio feed may also be transmitted via cellular communications (i.e., via radio access networks and a core network). In some embodiments, a video feed of the bank teller may also be provided to the user in step S275. For example, a video feed including video data captured by a camera of the bank teller's device may be transmitted to the ATM and displayed on the display of the ATM.

In step S280, the user leaves the interactive transaction session. This may be by hanging up the phone or powering down their mobile device or putting their mobile device in standby mode or the like. Thereafter, in step S285, the bank teller closes the interactive transaction session by making the appropriate selection on their computing device.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

What is claimed is:

1. A computer-implemented method for establishing a communication link between a mobile device of a user of an ATM and a telecommunications device of a selected remote bank teller, comprising:
   detecting, at an ATM, an input event indicating that a user of the ATM wants to communicate with a bank teller;
   responsive to detecting the input event, by the ATM, sending a notification to at least one first telecommunications device of a selected remote bank teller indicating that the user wants to communicate and requesting the user to input contact information into the ATM and/or to scan a machine-readable code displayed on the ATM with a mobile device of the user; and
   responsive to the user inputting the contact information into the ATM and/or scanning the machine-readable code displayed on the ATM with the mobile device, establishing, by the first telecommunications device or a second telecommunications device of the selected remote bank teller, a communication link with the mobile device of the user for audio communications between the remote bank teller and the user.

2. The method of claim 1, further comprising:
   responsive to sending the notification to the first telecommunications device, accessing, by the first telecommunications device of the selected remote bank teller, a web-based communication portal via a web browser executing on the first telecommunications device; and
   responsive to scanning the machine-readable code displayed on the ATM with the mobile device, accessing, by the mobile device, the web-based communication portal via a web browser executing on the mobile device;
   thereby establishing the communication link between the first telecommunications device and the mobile device.

3. The method of claim 2, wherein the first telecommunications device is a desktop computer or a laptop or a mobile device of the selected remote bank teller.

4. The method of claim 2, wherein the machine-readable code is a one-dimensional or two-dimensional barcode, and is optionally a quick response code.

5. The method of claim 2, further comprising:
   responsive to detecting the input event, displaying the machine-readable code on a display of the ATM; and
   scanning, by the mobile device, the machine-readable code that is displayed on the display of the ATM.

6. The method of claim 2, further comprising:
   responsive to detecting the input event, requesting the user to scan a machine-readable code displayed on a housing of the ATM with a mobile device of the user; and
   scanning, by the mobile device, the machine-readable code that is displayed on the housing of the ATM.

7. The method of claim 1, further comprising:
responsive to sending the notification to the first telecommunications device, accessing, by the first telecommunications device of the selected remote bank teller, a web-based communication portal via a web browser executing on the first telecommunications device;
responsive to the user inputting an email address for the user into the ATM, receiving, at the mobile device, a web link via email for accessing the web-based communication portal; and
responsive to the mobile device determining that the web link has been selected by the user, accessing, by the mobile device, the web-based communication portal via a web browser executing on the mobile device;
thereby establishing the communication link between the first telecommunications device and the mobile device.

8. The method of claim 7, wherein the first telecommunications device is a desktop computer or a laptop or a mobile device of the selected remote bank teller.

9. The method of claim 2, further comprising:
establishing the communication link as a Voice over Internet Protocol communication link.

10. A computer-implemented method for establishing a communication link between a mobile device of a user of an ATM and a telecommunications device of a selected remote bank teller, comprising:
detecting, at an ATM, an input event indicating that a user of the ATM wants to communicate with a bank teller;
responsive to detecting the input event, by the ATM, sending a notification to at least one first telecommunications device of a selected remote bank teller indicating that the user wants to communicate and requesting the user to input contact information into the ATM and/or to scan a machine-readable code displayed on the ATM with a mobile device of the user;
responsive to the user inputting the contact information into the ATM and/or scanning the machine-readable code displayed on the ATM with the mobile device, establishing, by the first telecommunications device or a second telecommunications device of the selected remote bank teller, a communication link with the mobile device of the user;
responsive to the user inputting a phone number of the mobile device into the ATM, sending, by the ATM, the phone number to the first telecommunications device of the selected remote bank teller; and
responsive to the first telecommunications device receiving the phone number, calling, by the second telecommunications device of the selected remote bank teller, the mobile device;
thereby establishing the communication link between the second telecommunications device and the mobile device for audio communications between the remote bank teller and the user.

11. The method of claim 10, wherein the first telecommunications device is a desktop computer or a laptop or a mobile device of the selected remote bank teller and the second telecommunications device is a landline or mobile device of the selected remote bank teller.

12. The method of claim 10, further comprising:
establishing the communication link between the first or second telecommunications device and the mobile device as an audio only communication link.

13. The method of claim 10, further comprising:
capturing audio data via a microphone of the mobile device;
via the communication link, transmitting the audio data to the first or second telecommunications device; and
outputting the audio data via a speaker of the first or second telecommunications device.

14. The method of claim 10, further comprising:
capturing audio data via a microphone of the first or second telecommunications device;
via the communication link, transmitting the audio data to the mobile device; and
outputting the audio data via a speaker of the mobile device.

15. The method of claim 10, further comprising:
capturing video data, via a camera of the ATM and/or of the mobile device;
providing the video data from the ATM and/or the mobile device to the first telecommunications device; and
displaying a video feed comprising the video data on a display of the first telecommunications device.

16. The method of claim 10, further comprising:
capturing video data, via a camera of the first telecommunications device;
providing the video data from the first telecommunications device to the ATM and/or to the mobile device; and
displaying a video feed comprising the video data on a display of the ATM and/or of the mobile device.

17. The method of claim 10, wherein the ATM is not an Interactive Teller Machine, ITM.

18. The method of claim 10, wherein:
detecting the input event is a request by the user for a web-based communication session with a bank teller or a cellular communication session with a bank teller.

19. A computing system, comprising:
an ATM, a mobile device of a user and at least one telecommunications device of a selected remote bank teller, wherein the ATM is configured to:
detect an input event indicating that a user of the ATM wants to communicate with a bank teller; and
send a notification to at least one first telecommunications device of the selected remote bank teller indicating that the user wants to communicate and request the user to input contact information into the ATM and/or to scan a machine-readable code displayed on the ATM with the mobile device of the user; wherein
responsive to the user inputting the contact information into the ATM and/or scanning the machine-readable code displayed on the ATM with the mobile device, the first telecommunications device or a second telecommunications device of the selected remote bank teller is configured to:
establish a communication link with the mobile device for audio communications between the remote bank teller and the user.

20. The computing system of claim 19, wherein the first telecommunications device is a desktop computer or a laptop or a mobile device of the selected remote bank teller and the second telecommunications device is a landline or mobile device of the selected remote bank teller.

* * * * *